Figure 6:
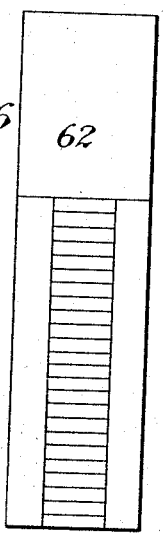

A. PESTEL.
EMPLOYEE'S TIME RECORDER.
APPLICATION FILED MAY 8, 1906.
974,912.
Patented Nov. 8, 1910.
4 SHEETS—SHEET 1.
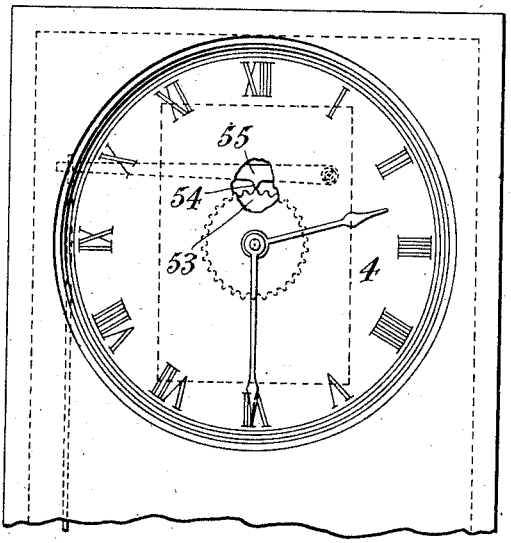
Fig.1
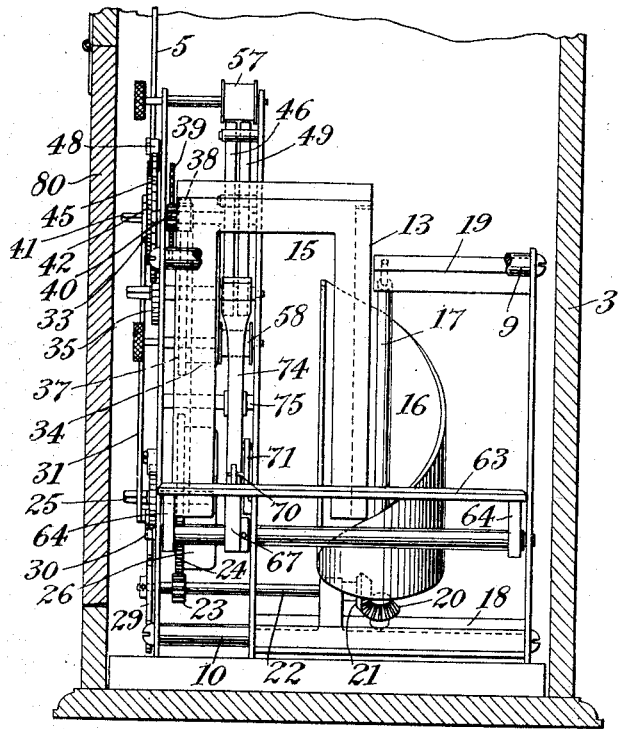
Witnesses:
Chas. D. King
R. Champion
Inventor:
Arthur Pestel,
by
Atty.

A. PESTEL.
EMPLOYEE'S TIME RECORDER.
APPLICATION FILED MAY 8, 1908.
974,912.
Patented Nov. 8, 1910.
4 SHEETS—SHEET 2.
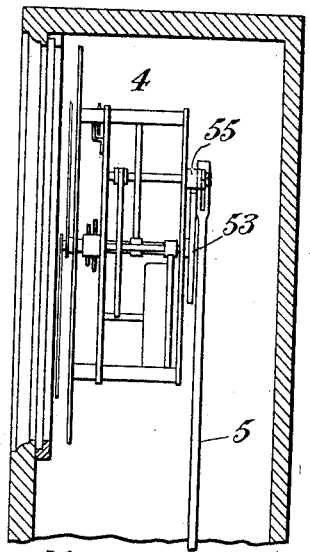
Fig. 2
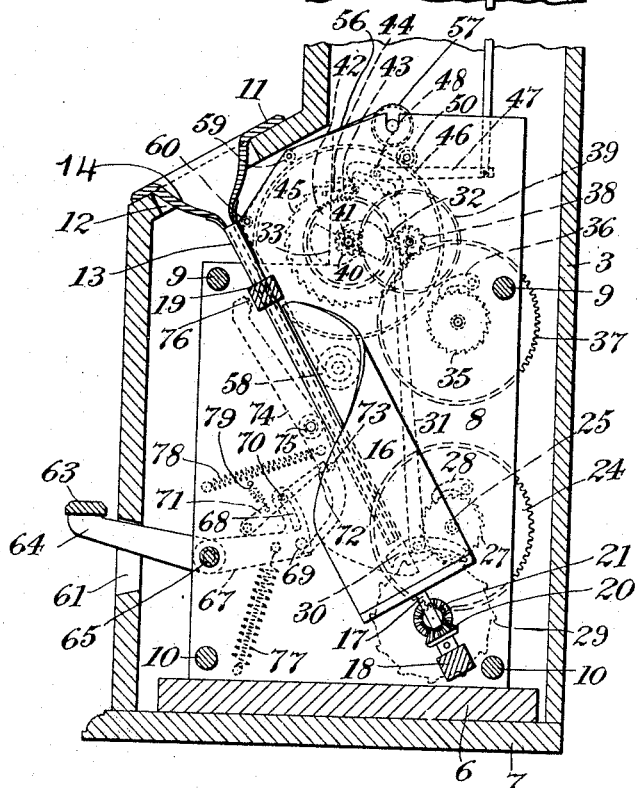
Witnesses:
Chas. W. King
R. Champion
Inventor:
Arthur Pestel,
by _____
Atty.

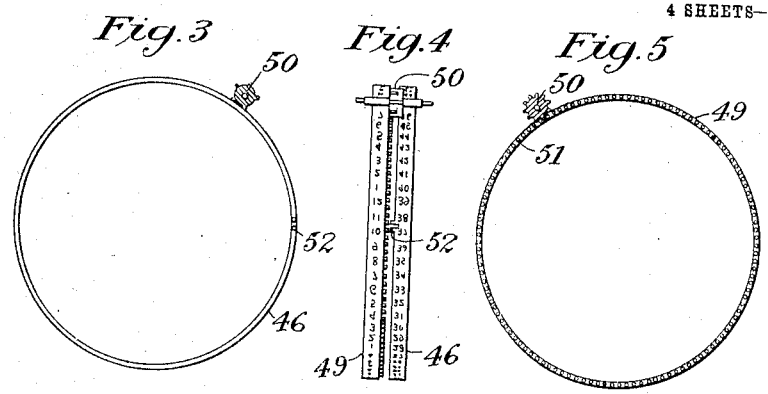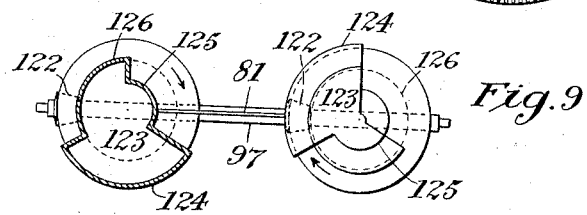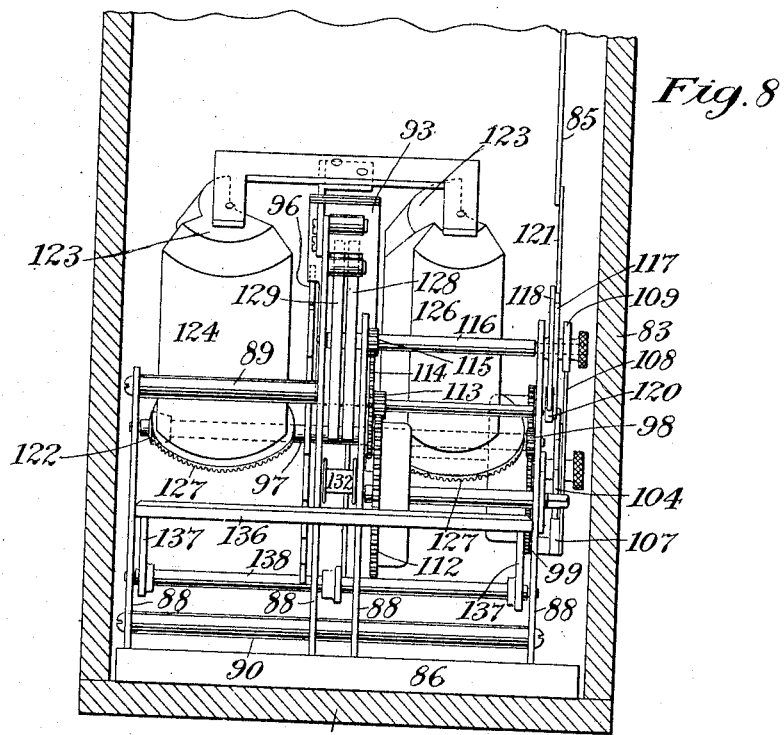

A. PESTEL.
EMPLOYEE'S TIME RECORDER.
APPLICATION FILED MAY 8, 1906.

974,912.

Patented Nov. 8, 1910.
4 SHEETS—SHEET 4.

Witnesses:
Chas. D. King.
R. Champion

Inventor:
Arthur Pestel
by
Atty.

UNITED STATES PATENT OFFICE.

ARTHUR PESTEL, OF BAYONNE, NEW JERSEY.

EMPLOYEE'S TIME-RECORDER.

974,912.

Specification of Letters Patent. Patented Nov. 8, 1910.

Application filed May 8, 1906. Serial No. 315,778.

*To all whom it may concern:*

Be it known that I, ARTHUR PESTEL, a subject of the German Emperor, and resident of Bayonne, in the county of Hudson and State of New Jersey, have invented certain new and useful Improvements in Employees' Time-Recorders, of which the following is a specification.

This invention relates to improvements in employees' time recorders, and its main object is to provide an improved apparatus of this type by means of which an employee's individual time-card may be positively located in any one of a plurality of positions corresponding to different times at which he begins or ends or begins and ends his work.

One of the principal features of the invention is a card-stop the stopping point of which is movable into and out of the path of a card placed in position in a card-guide, this card-stop being preferably a multiplex one adapted to locate a card in any one of a large number of positions, the number of which is determined by the use to which the mechanism of the machine is to be put. For example, the time-recorder may be of a type in which it is desired to locate the time-card in different positions for each hour or half-hour of the day, in which case the time-card should be located in a new position for each half-hour or hour by means of a card-stop, which in such case will have a plurality of stop-faces corresponding to the number of times in a given day that a card is to be brought to a different position to receive its record.

Another important feature of my invention is to provide in connection with means for locating a card in any one of a large number of positions representing different times of a day, other suitable means for locating a card in different positions representing different times of a week, the means employed having preferably, as in the stops for representing the different parts of a day, a plurality of stop-faces movable into and out of engagement with the card whose position is to be controlled. Preferably suitable time-controlled mechanism will be employed for determining which stop face of each set shall be brought into action, and the stops of the two sets may be so connected as to maintain a predetermined relationship in their movements.

These and other features of my invention not hereinbefore referred to but which will be hereinafter described, are illustrated in the accompanying drawings, in which—

Figure 10:
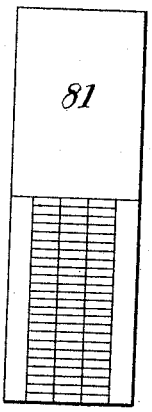
Figure 11:
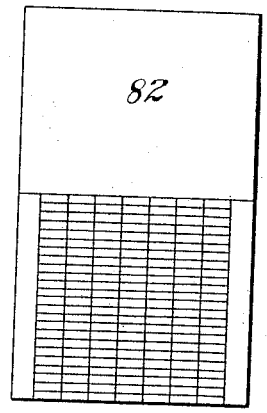
Figure 7:
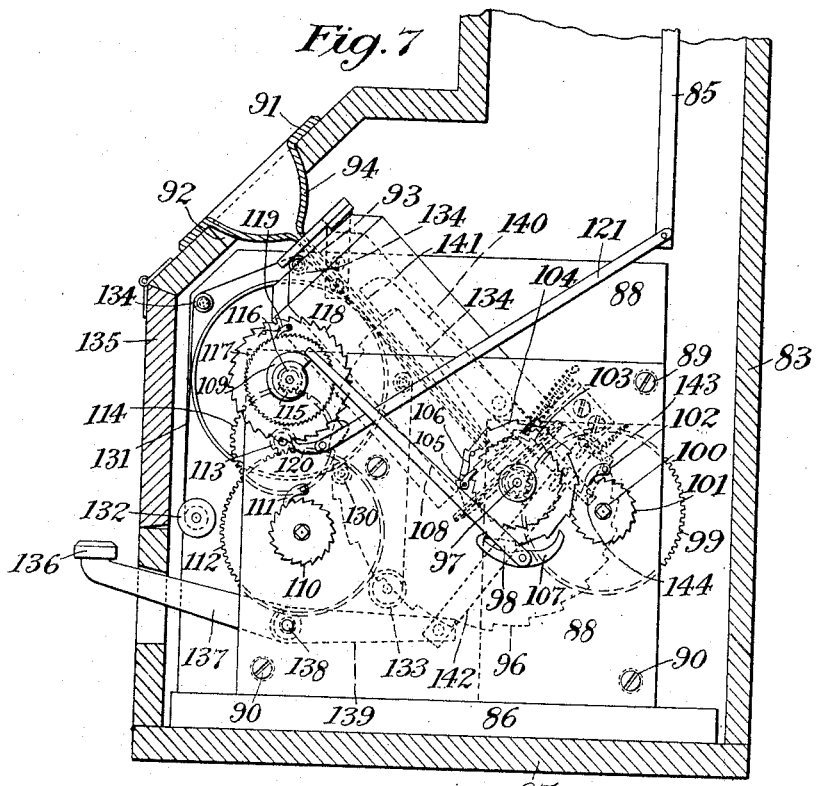

Figure 1 is a sectional front elevation of an employee's time recorder embodying my invention and of a type in which a time-card may be located in different positions in the length thereof but is locatable in only a single position in the direction of its breadth. Fig. 2 is a vertical section of the same, the section being taken in line 2 of Fig. 1, looking in the direction of the arrow. Figs. 3, 4 and 5 are enlarged details of the recording-wheels and other parts hereinafter described. Fig. 6 is a detail of the time-card adapted for use in connection with the machine shown in Figs. 1 and 2. Fig. 7 is a view similar to Fig. 2 of the lower portion of an employee's time recorder embodying my invention and illustrating a modification of said invention in which the time-card is shiftable sidewise as well as lengthwise. Fig. 8 is a sectional front elevation of the same, the view being similar to the lower portion of Fig. 1. Fig. 9 is a detail of the means for locating the time-card in different positions sidewise. Figs. 10 and 11 are details of two different types of time-cards adapted to be located in different positions both lengthwise and crosswise, that shown in Fig. 10 being intended for use with the machine illustrated in Figs. 7 and 8.

Similar characters designate like parts in all the figures of the drawings.

Referring first to Figs. 1 and 2, 3 illustrates a casing of any suitable type for inclosing the various operative parts of my improved time-recorder. Within the upper part of this casing a time mechanism, such as 4, which may also be of any suitable construction, may be mounted, in the well-known manner. In the bottom of this casing the recording mechanism is preferably carried, and the time mechanism or clock 4 is or may be connected to the recording mechanism at the bottom of the casing in any suitable manner, as for example, by the connecting-rod 5. Various parts of the recording mechanism may be mounted on a suitable frame so as to be insertible and removable as a whole into and from the casing 3. The base of such frame is shown at 6, and may be secured and fastened to the bottom 7 of the casing. The main portions of the frame mounted on the base 6 are side pieces, such as 8, connected by suitable rods or spacing members, such as 9 and 10. The lower portion of the casing 3 is larger than the upper portion, in the construction shown, and has a sloping portion or shelf 11 at the front thereof formed with an opening 12 therein for the reception of a card-guide. This card-guide, which is designated generally by 13, has a flaring mouth 14 the lips of which rest upon the shelf 11. The body of the card-guide extends downward diagonally and may be held in place in any suitable manner. This card-guide constitutes a long and relatively wide but shallow guide-way, into which the employee's time-card is intended to be inserted through the wide mouth portion 14 thereof. The main portion or body of the card-guide is not shown as solid, however, but as having a wide, deep recess or cut-out portion 15 extending from the lower almost to the upper end thereof and approximately from side to side of the same, leaving only sufficient material to guide and support a time-card properly. The nature and extent of this opening may, however, be varied considerably. Within this opening it is intended to work a suitable stop for limiting the movement of a card placed in said card-guide and thereby locating such card in position to receive a record. The means employed for locating such a card may be any suitable for the purpose, provided each individual stop-face thereof is movable into and out of the path of the card, that is, provided each element or stop-face capable of locating the card in a different position is so movable into and out of the path of the card. Preferably the means for locating the card in the various positions is a rotary stop, such for example as the stop-cylinder 16. This stop-cylinder is secured to a shaft or spindle 17 the lower end of which is supported in a bearing in the cross-piece 18, and the upper end of which may be supported in a similar manner in a bearing in the cross-piece 19.

The stop-face of the stop-cylinder 16 is in Figs. 1 and 2 shown as a spiral cam having a multiplicity of stop-faces or stopping points connected with one another by a gradually rising and falling cam-face, these stop-faces being movable about their common axis in the shaft 17. With a stop of such a type as this stop-cylinder it will be seen that any desired number of stop positions, regularly or irregularly spaced, may be obtained, and that the stopping points of the stop-cylinder, and hence the positions in which the time-card is stopped, will depend upon the manner in which the stop-cylinder is operated, that is, upon the extent to which it is turned between successive stop positions. Here, the spindle 17 has at its lower end a beveled gear or pinion 20, which meshes with a similar beveled gear or pinion 21 carried on the inner end of a spindle 22 mounted in suitable bearings in the framework and carrying a spur pinion 23 near its opposite end. This spur pinion is driven by a large spur gear 24 mounted on an arbor 25 located within a spring-drum 26. Said arbor carries a ratchet-wheel 27, the ratchet-teeth of which are engaged by a stop-pawl 28. On the end of the spindle or arbor 22 near the pinion 23 is also a large ratchet-wheel or escapement-wheel 29, the teeth of which coact with pallets of an escapement 30 pivoted at the lower end of a long lever-arm 31, the upper end or toe 32 of which rests against one or the other of the cam-faces of a cam 33. A suitable spring is contained within the spring-drum 26, and whenever the escapement 30 releases the escapement-wheel 29 the spring within said spring-drum acting through the spur-gear 24 and the pinion 23 serves to rotate the spindle 22, and hence the stop-cylinder 16, a distance equal to the interval between two successive stopping points on the spiral cam stopping-face of the stop-cylinder.

For the purpose of turning the controlling cam 33, a similar motor to that just described may be used, that is to say, a similar spring-drum may be employed, such spring-drum being indicated at 34. The spring within this spring-drum, is not shown, but an escapement-wheel 35, a stop-pawl 36 and a spur-gear 37 similar to the corresponding parts of the lower spring-drum, are shown. The spur-gear 37 meshes with the spur-pinion 38 mounted on an arbor carrying an intermediate gear 39 meshing with the teeth of a spur-pinion 40 carried by an arbor 41. On this same arbor is a ratchet-wheel 42 having fine ratchet-teeth which coact with a stop-pawl 43 pressed against the teeth of said ratchet-wheel by a light spring 44 carried in this case by an escapement-wheel 45 on the same axis. This escapement-wheel in turn moves in unison with a recording-wheel which in this instance is the minute-wheel 46 of the recording mechanism. From the connecting-rod 5 extending from and operated by the time mechanism or clockwork 4 a lever-arm 47 of an escapement 48 extends. The movements of the connecting-rod 5 may be imparted to the escapement 48 as often as desired. As here shown, the escapement-wheel 45 advances a distance equal to half the length of a ratchet-tooth each time the escapement 48 is vibrated. At each such vibration of the escapement the power of the spring contained in the upper spring-drum 34 is transmitted through the spur-gear 37 and the pinion 38 and from the intermediate 39 to the spur-pinion 40, and the arbor or spindle 41 is turned, carrying with it the minute recording-wheel 46 a distance representing a time interval of one minute.

On the same shaft with the minute-recording wheel 46 is an hour-recording wheel 49, which is loose on the arbor or spindle 41. The movements of the minute-wheel are transferred to the hour-wheel by a transmitting or carrying device preferably of the type illustrated in Figs. 4 and 5, in which it will be seen that the carrying pinion 50 has alternating long and short teeth all of which are adapted to engage, at the side thereof nearest the hour-recording wheel 49, with the teeth of a crown gear 51 projecting from the edge of the hour-wheel 49, while only the alternate or long teeth of said pinion are adapted to engage with a pair of teeth 52 projecting from the opposite edge of the minute-recording wheel 46. By means of this carrying pinion the hour-wheel is advanced one step each time that the pins or teeth 52 make a complete revolution. The minute and hour wheels carry types for recording on the time-card the minutes and hours. On the minute-wheel these types run from 0 to 59, while on the hour-wheel there are five sets of twelve each, making sixty in all, that is, the same number as on the minute-recording wheel, each such set on the hour-wheel consisting of the numbers 1 to 12 inclusive. Thus each set on the hour-wheel is capable of recording any hour of day or night, though having only twelve different numbers thereon. The movements of the connecting-rod 5 for operating the main escapement 48 may be derived directly from a toothed-wheel 53 having thirty teeth therein, each coacting with a single tooth 54 on a lever 55 (see Fig. 1) carried by the clockwork 4. Each of the thirty teeth of the wheel 53 controls both an up and a down movement of the lever 55, and therefore controls corresponding up and down movements of the connecting-rod 5 by means of which the opposite vibrations of the escapement 48 are effected alternately, one each minute. On the arbor 41 there is also secured, as before stated, the cam 33. This is a two-lobed cam, the two rises and falls of which are disposed oppositely. These cams coact with the toe 32 of the lever 31 in such a manner as to oscillate said lever back and forth twice during each complete rotation of the cam 33, and correspondingly oscillate the escapement 30. Thus every quarter of an hour the lever 31 is rocked one way or the other, and through the connections from the lower spring-drum 26 a feed movement is imparted every quarter of an hour to the escapement-wheel 29 and the stop-cylinder 16. Only the stop positions of the cylinder 16 at hour intervals need be considered at this time, although of course the stopping points at half hour and quarter-hour intervals may be utilized, if desired; or stopping points separated by intervals which are multiples of an hour or by irregular intervals, may be used.

For the purpose of printing upon a time-card the time shown by the types on the wheels 46 and 49 opposite the printing point, I have illustrated herein inking means in the form of an inking-ribbon 56 which passes from one to the other of a pair of spools 57 and 58 over guide-rolls, such as 59 and 60. This inking-ribbon may be fed in any desired manner and the spools may be readily removed from and placed in position for the renewal of the ribbon.

Near the bottom of the front of the casing is an opening 61 through which projects a key or lever constituting part of the impression mechanism. For the purpose of causing the types on the wheels 46 and 49 to print upon a time-card, such for example as 62 (see Fig. 6) I may employ a key-operated impression mechanism of substantially the type shown. In the construction illustrated this mechanism includes a finger-bar 63 secured to rock-arms 64 fastened to a rock-shaft 65, to which is also secured a rock-arm 67 slotted at 68 and having a laterally projecting stop or pin 69. Within the slot 68 works a pin 70 carried by a short lever 71 pivoted to the framework and having at its free end a blocking face or stop-face 72. This blocking-face 72 normally rests against a stop 73 carried by a pivoted impression-bar 74, the pivot of which is illustrated at 75. The upper end of this impression-bar carries an impression device or hammer 76, and at its lower end is bent backward into contact with the stop-pin 69 on the rock-arm 67. Springs, such as 77 and 78, are connected respectively to the stop-arm 67 and the impression-bar 74 at suitable points. The spring 79 also normally holds the short lever 71 in the position illustrated in Fig. 2. In the position shown in said view the spring 77 is in its normal position, while the spring 78 is expanded and in condition to throw the hammer 76 sharply against the time-card and the types on the wheels 46 and 49 when the lever 74 is released. Said lever, however, will be held in the position shown after the finger-bar 63 is depressed almost to the limit of its downward movement and until the opposite end-wall of the slot 68 comes in contact with the pin 70 and striking the same releases the blocking-face 72 of the short lever 71 from the pin 73 on the impression-lever 74, when said short lever 71 will pass between the pin 75 and the pivot of the impression-lever, and the spring 78 will actuate the impression-lever 74 quickly and will force the hammer 76 against the time-card and the type-wheels with a sharp blow, whereupon the hour and minute of operation of the apparatus will be recorded upon the time-card in the proper horizontal column corresponding to the position in which the card is located by the spiral stop-face on the stop-cylinder 16.

It will be noticed (see particularly Fig. 1) that the spiral stop-face of the cylinder 16 gradually moves into and through the plane of the card-guide 13 and of the time-card placed therein. As it so moves, the stopping point of the lower end of the time-card will be changed, and the position of the stop-face, which limits the position of the lower end of the time-card, will vary in accordance with the movements of the mechanism controlled by the clock 4.

If a time-card such as 62 is employed with the mechanism just described, the card may be located in any one of twenty-four different positions, each of which will represent a different hour of the day, and hence with such a time-card it is assumed that the spiral cam-face of the stop-cylinder 16 contains twenty-four principal stopping points, suitably connected with one another.

For convenience of access to the interior parts, a door, such as 80, may be employed at one side of the lower end of the casing 3. This door may be locked and the key kept by some superior officer, as for example by a superintendent or foreman.

In Figs. 7, 8 and 9 I have illustrated a modification of my invention in which means is illustrated for locating a time-card in different positions sidewise as well as in different positions lengthwise. The principal object of this is to permit an individual time-card to be employed on which records may be made for the different times of a week. One such time-card is illustrated at 81, and is adapted to contain records for each of the twenty-four hours of three days of the week, while that shown at 82 is adapted to contain records for each hour of the day each day of the week. The mechanism illustrated in Figs. 7 and 8 is intended to be used in connection with the time-card illustrated at 81. A casing 83 similar to that shown at 3, contains as before an operating connecting-rod 85 actuated from a clockwork (not shown) in the same manner as the connecting-rod 5 in Figs. 1 and 2. 86 represents the base of a framework within the casing, which framework is mounted on the bottom 87 of the casing and carries all of the operating parts of this time-recorder. 88 indicates uprights or frame members, and 89 and 90 spacing-rods of the frame. 91 represents a sloping wall and 92 an opening therein similar to corresponding parts of Figs. 1 and 2. 93 designates generally a card-guide and 94 the flaring or mouth portion thereof. 96 designates the stop device employed in this apparatus for locating a time-card in different positions lengthwise. Here this device is not a stop-cylinder, but a stepped cam having twenty-four stopping-points or stop-faces located at different distances from their common axis, which is that of the cam. Each of these stop-faces serves to locate the time-card 81 in a different position lengthwise of such card. This cam is substantially centrally disposed, and the different stop-faces or steps thereof move into and out of the path of the time-card while remaining always substantially in the central longitudinal plane of such card. The stop-cam 96 is carried on a spindle or arbor 97 suitably mounted in the framework. This arbor carries also a spur-pinion 98 which meshes with the teeth of the spur-gear 99 secured to the arbor 100 of a spring-drum containing a spring (not shown), a ratchet-wheel 101 and a holding-pawl 102 for such ratchet-wheel. The power of the spring in this spring-drum is transmitted through the spur-gear 99 to the spur-pinion 98 in a manner similar to that before described with respect to Figs. 1 and 2. Here the arbor 97 also has thereon a fine-toothed ratchet-wheel 103 and a coarse ratchet-wheel 104. The ratchet-wheel 103 has twenty-four teeth, and the ratchet-wheel 104 twelve teeth. A pawl and spring 105 and 106 are provided for the ratchet-wheel 103, and an escapement 107 controls the let-off movements of the ratchet-wheel 104. The escapement 107 is operated by a lever-arm 108 controlled by a cam 109 on the arbor of the main escapement mechanism governed directly from the clockwork (not shown) by the connecting-rod 85, the escapement 107 and the parts controlled thereby being governed from the escapement mechanism connected directly with the clockwork instead of being itself controlled directly from the clockwork. This main escapement mechanism is similar to the one just described and also similar to the corresponding mechanism shown in Figs. 1 and 2. It comprises a spring-drum, the power of the spring (not shown) in which is restrained by a ratchet-wheel 110 and a hold-back pawl 111, and is let off through a large spur-pinion 112 meshing with an idle pinion 113 which carries on the same shaft therewith an idle gear 114 which in turn drives a spur-pinion 115 on the arbor 116 to which the cam 109 is secured. This arbor also carries a fine-toothed ratchet-wheel 117 and a coarse ratchet-wheel 118, the former of which contains sixty teeth and the latter thirty, the ratchet-wheel 117 thus having one tooth for each minute. A spring-pressed pawl 119 similar to that at 105 is also shown in connection with the ratchet-wheels 117 and 118. An escapement 120, which is the main escapement of this machine, coacts with the teeth of the ratchet-wheel 118 and is carried at the lower end of a lever 121 connected in turn with the lower end of the rod 85. As the connecting-rod 85 is moved up and down by the clockwork (not shown) the escapement 120 is vibrated back and forth and the power of the spring in the spring-drum at the front of the machine it let off through the train of gears connected with the spur-gear 112, and the ratchet-wheel 117 is advanced one step at each vibration, that is, a distance representing one minute. At each complete rotation of the spindle 116 on which said ratchet-wheel is mounted, the cam 109 oscillates the lever-arm 108 first in one direction and then in the other to impart a corresponding feed movement to one tooth of the ratchet-wheel 104, that is, said ratchet-wheel is advanced one step each hour by the operation of the spring contained in the spring-drum at the rear of the machine when the power of said spring is let off by the escapement 107 by the train of gearing controlled by the spur-gear 99.

The movement of the ratchet-wheel 104 is utilized in this apparatus to operate, through the arbor or spindle 97, means for shifting the time-card 81 sidewise at the end of each day. In this case the opening in the card-guide 93 is of such width as to permit the shifting of the time-card to three different operating positions, in which it is located by suitable side stops. These side stops are in the present case operated directly from the shaft 97 by bevel pinions, such as 122, these bevel pinions being at least two in number and serving to operate respectively a pair of card-stops, such as 123, for engaging opposite side edges of the time-card. The stops 123, as herein shown, are a pair of cylindrical members of suitable length disposed lengthwise of the card-guide and each having three longitudinal stop-faces defined by arcs of different circles, the three stops being substantially equidistant from one another. These three stops are shown most clearly in Fig. 9 and are designated respectively by 124, 125 and 126. They are connected by radial walls which constitute the drops from one level of the stop-cylinder to the other. By referring to Fig. 9 it will be seen that the three stop-faces of each stop-cylinder coöperate in such a manner that the time-card 81 is located at its sides between dissimilar stop-faces except in the case of the stop-face 126, that is to say, a stop-face 125 on one stop-cylinder always coöperates with a stop-face 124 on the other stop-cylinder for locating the time-card 81, and a stop-face 124 on one cylinder never coöperates with the corresponding stop-face 124 of the other cylinder; nor do the two stop-faces 125 coöperate. By this coaction of the stop-faces of these cylinders the time-card 81 may be located in three different positions sidewise, which positions are indicated by the circles and arcs in Fig. 9. In order to maintain the proper relation between the positions of the stop-faces of the respective stop-cylinders 123, said cylinders have in this case at their lower ends like bevel gears 127, which mesh with the bevel pinions 122, and by which said cylinders are caused to rotate in unison. The ratio of the bevel gearing 122 and 127 is such that for every two complete rotations of the ratchet-wheels 103 and 104 carried by the arbor 97, the stop-cylinders 123 will make one-third of a rotation, that is, they will make such a one-half rotation once each day.

The minute and hour recording wheels of this apparatus are or may be the same as those shown in Figs. 1 and 2. They are indicated at 128 and 129. The carrying pinion may also be the same as that before described, and is indicated at 130. Similar inking means to that before described is also shown, the inking-ribbon being designated by 131, the spools by 132 and 133, and the guide-rolls by 134. A swinging door 135 is also shown at the front of the machine, which door may be locked, as before described.

For the purpose of printing from the type-wheels 128 and 129 on a time-card 81 I make use of impression mechanism similar to that shown in Figs. 1 and 2. A finger-bar is indicated at 136 supported by rock-arms 137 secured to a rock-shaft 138, from which rock-shaft another rock-arm 139 extends rearwardly. This rock-arm controls by suitable connections a pivoted impression-lever 140 having a hammer 141 at its upper end. The impression-lever is disposed at the upper side of the time-card in this case, and the printing-wheels and finger-bar below it, connection being made to the impression-lever 140 from the rock-arm 139 by means of devices similar to those shown in connection with Figs. 1 and 2. These devices, as illustrated, consist of a connecting-rod 142 pivoted to the rear end of the rock-arm 139 and also having a loose connection with the impression-lever 140 at a point at the side of the pivot of said impression-lever which is opposite the hammer 141. This loose connection is made by slotting the connecting-rod or bar 142 so that it will be guided by a pin near the lower end of the impression-lever 140. An angular spring-pressed blocking-lever 143 having similar functions to that of the blocking-lever in Figs. 1 and 2 is pivoted at a suitable point on the framework and has a pin-and-slot connection at one end with the connecting-rod 142, and at its other end is adapted to come in contact with a stop 144 at the lower end of the impression-lever 140. On the depression of the finger-bar the impression-lever 140 is held by the blocking-lever 143 until said finger-bar is nearly at the end of its downward stroke, when the blocking-lever 143 will be released in the same manner as hereinbefore described in connection with Figs. 1 and 2, and the impression-lever will thereupon be actuated quickly by its spring (not shown) to bring the hammer 141 into engagement with the time-card to cause the latter to be printed upon by the two printing-wheels.

In either type of apparatus illustrated in the drawings, change gearing may be used between the driving mechanism and the means for stopping the card in different positions, especially in different positions in the direction of its length. By means of such change gearing the stop-cylinder of Figs. 1 and 2 or the cam-disk of the modified type of apparatus may be turned any desired distance before stopping and thus may serve to provide a different number of stopping points spaced at a greater or less distance apart than hereinbefore described for the purpose of adapting the machine for all kinds of work. By means of such change gearing a single machine may be adapted for use to operate upon cards at any desired time intervals, that is, at any desired hours of the day, as well as any desired number of days per week.

What I claim is:

1. An employee's time recorder, embodying time-controlled recording means, a card-guide, a single stop member having a plurality of stop-faces in a common plane and movable into and out of the path of a card in the card-guide, and means for actuating said stop member to bring its stop-faces successively into operative position.

2. An employee's time recorder, embodying time-controlled recording means, a card-guide, a card-stopping device having a plurality of stop faces mounted to turn about an axis and disposed in a common plane and movable into and out of the path of a card in the card-guide, and means for automatically turning said stopping device.

3. An employee's time recorder, embodying time-controlled recording means, a card-guide, a card-stopping device having a plurality of stop faces mounted to turn about an axis and disposed in a common plane and movable into and out of the path of a card in the card-guide, and time-controlled means for automatically turning said stopping device.

4. An employee's time recorder, embodying time-controlled recording means, a card-guide, a card-stopping device having a plurality of stop faces mounted to turn about an axis and disposed in a common plane at successively varying distances from a common axis and movable into and out of the path of a card in the card-guide, and means for automatically turning said stopping device.

5. An employee's time recorder, embodying time-controlled recording means, a card-guide, a rotary stop member having a series of twenty-four stop faces disposed respectively at successively varying distances from its axis and rotatable about said axis into and out of the path of a card in the card-guide, and time-controlled means for automatically turning said stop member one step each hour.

6. An employee's time recorder, embodying time-controlled recording means, a card-guide, a rotary stop member having a circuit of stop faces disposed at successively varying distances from its axis and rotatable about said axis into and out of the path of a card in the card-guide in the direction of one dimension of said guide, means for automatically turning said stop member step by step, and means for shifting said card in the direction of the other dimension of the card-guide.

7. An employee's time recorder, embodying time-controlled recording means, a card-guide, a rotary stop member having a circuit of stop-faces disposed at successively varying distances from its axis and rotatable about said axis into and out of the path of a card in the card-guide in the direction of one dimension of said guide, time-controlled means for automatically turning said stop member one step each hour, and means for shifting said card in the direction of the other dimension of the card-guide.

8. An employee's time recorder, embodying time-controlled recording means, a card-guide, a card-stop having stop-faces movable into and out of the path of a card in the card-guide in the direction of one dimension of said guide, means for automatically shifting said card-stop, and time-controlled means for shifting said card from its normal position to each one of a plurality of successive positions in the direction of the other dimension of the card-guide.

9. An employee's time recorder, embodying time-controlled recording means, a card-guide, a card-stop having stop-faces movable into and out of the path of a card in the card-guide in the direction of one dimension of said guide, means for automatically shifting said card-stop, and rotary card-positioning means for shifting said card from its normal position to each one of a plurality of successive positions in the direction of the other dimension of the card-guide.

10. An employee's time recorder, embodying time-controlled recording means, a card-guide, a card-stop having a stop-face movable into and out of the path of a card in the card-guide in the direction of one dimension of said guide, means for automatically shifting said card-stop, and rotary time-controlled card-positioning means for shifting said card from its normal position to each one of a plurality of successive positions in the direction of the other dimension of the card-guide.

Signed at New York, in the county of New York, and State of New York, this 3d day of May, A. D. 1906.

ARTHUR PESTEL.

Witnesses:
C. S. CHAMPION,
EDGAR A. FELLOWS.